United States Patent
Li et al.

(10) Patent No.: US 10,301,894 B2
(45) Date of Patent: May 28, 2019

(54) EXPERIMENTAL DEVICE AND METHOD USED FOR POLYPHASE SEPARATION OF NATURAL GAS HYDRATE DRILLING FLUID

(71) Applicant: GUANGZHOU INSTITUTE OF ENERGY CONVERSION, CHINESE ACADEMY OF SCIENCES, Guangzhou, Guangdong (CN)

(72) Inventors: Xiaosen Li, Guangzhou (CN); Yu Zhang, Guangzhou (CN); Yi Wang, Guangzhou (CN); Gang Li, Guangzhou (CN); Ningsheng Huang, Guangzhou (CN); Zhaoyang Chen, Guangzhou (CN)

(73) Assignee: GUANGZHOU INSTITUTE OF ENERGY CONVERSION, CHINESE ACADEMY OF SCIENCES, Guangdong (CN)

( * ) Notice: Subject to any disclaimer, the term of this patent is extended or adjusted under 35 U.S.C. 154(b) by 213 days.

(21) Appl. No.: 15/590,219

(22) Filed: May 9, 2017

(65) Prior Publication Data

US 2018/0171732 A1   Jun. 21, 2018

(30) Foreign Application Priority Data

Dec. 20, 2016  (CN) .......................... 2016 1 1186004

(51) Int. Cl.
*B21B 21/06*  (2006.01)
*B01D 19/00*  (2006.01)
*E21B 21/06*  (2006.01)

(52) U.S. Cl.
CPC ........ *E21B 21/067* (2013.01); *B01D 19/0005* (2013.01); *E21B 21/065* (2013.01)

(58) Field of Classification Search
CPC ..... B21B 21/06; B21B 21/063; B21B 21/065; B21B 21/067; B21B 21/07; B21B 43/00;
(Continued)

(56) References Cited

U.S. PATENT DOCUMENTS 5,775,442 A    7/1998  Speed
2007/0163780 A1*  7/2007  Onodera ................. E21B 43/00
                                                      166/250.07

* cited by examiner

*Primary Examiner* — Thuan D Dang
(74) *Attorney, Agent, or Firm* — Westerman, Hattori, Daniels & Adrian, LLP

(57) ABSTRACT

An experimental device of polyphase separation of natural gas hydrate drilling fluid, and method of use thereof, comprising a solid-phase separator, a liquid injection module, a gas injection module and a gas-liquid separator. The solid-phase separator comprises a first filter device and a second filter device, the gas injection module injects gas into the solid-phase separator while the liquid injection module injects liquid into the solid-phase separator, and the gas-liquid separator is communicated with the solid-phase separator through a pressure control valve. In the experimental device and method, the combination of the liquid and the gas injection modules keeps the solid-phase separator in a high-pressure state of the gas-liquid mixture constantly to achieve the polyphase separation of natural gas hydrate drilling fluid under a high pressure, while avoiding the formation of new hydrates during separation; the provision of the dual-filter device in the solid-phase separator aids in preventing equipment blockages.

6 Claims, 2 Drawing Sheets

(58) Field of Classification Search
CPC ......... B21B 43/34; B21B 43/40; B21B 43/48; B01D 19/00; B01D 19/0031; B01D 19/0068; B01D 36/001; B01D 36/002; B01D 37/00; B01D 46/00; B01D 46/0019; B01D 46/0023; B01D 46/0027
USPC .... 166/105.5, 105.1, 267; 175/66, 206, 207; 95/241, 254, 259; 96/155, 181, 182, 215, 96/219; 210/180, 188
See application file for complete search history.

EXPERIMENTAL DEVICE AND METHOD USED FOR POLYPHASE SEPARATION OF NATURAL GAS HYDRATE DRILLING FLUID

FIELD OF THE INVENTION

The present invention relates to the technical field of the polyphase separation of natural gas hydrate, and more specifically, to a system and a method for measuring the polyphase separation of natural gas hydrate drilling fluid.

BACKGROUND OF THE INVENTION

Natural gas hydrate, commonly known as "combustible ice", is widely distributed in the continental permafrost regions, the slopes of islands, the uplifted zones of the active and passive continental margins and some deep-water environments of the inland lakes in nature. In view of the particularity of the forming and reserving conditions of natural gas hydrates, so far the distribution of the vast majority of the gas hydrates in the world has been indirectly confirmed by the evidence obtained from geophysical surveys, except for a few samples of natural gas hydrates obtained from subsea drilling and seabed sediment sampling. Although significant progress has been made in the understanding of the reserves, distribution and characteristics of natural gas hydrates, people still need to conduct more scientific drilling and wellbore testing to further improve the understanding of the hydrates in terms of energy resources, geological hazards and impacts on the climate changes; however, a series of key scientific problems and technical challenges need to be settled before this.

The formation and stabilization of natural gas hydrates require an exceptional high-pressure and low-temperature environment. During the drilling process of natural gas hydrates, a large amount of heat energy will be produced by the process of rock cutting with a drill bit and the friction between the drilling tool at the bottom of the well and the well wall and rock core, as well as the release of the formation stress near the wall and the bottom of the well, which will result in the decomposition of natural gas hydrates into gas and decomposed water, thus greatly reducing the geomechanical stability of the sediments. Because the mineral reserves of natural gas hydrates, especially those in sea areas, are usually present at a relatively shallow depth, risks such as gas seepage, gas leakage and sleeve collapse are more likely to occur during the drilling process of natural gas hydrates compared with conventional oil and gas reserves.

In view of the foreseeable risks during the drilling process of natural gas hydrates, it is necessary to study the producing mechanism and the controlling method of all the geological hazards related to the drilling process of natural gas hydrates with various characteristics. A limited number of trial exploitations of the hydrates carried out internationally are all focused on the studies on the geological changes and hazards that may be caused during the drilling process. For example, the Natural Gas Hydrate Combined Industry Program in the Gulf of Mexico, established in 2001, is part of the effort on studies of the hazards associated with well drilling in the hydrate sediments. However, the field testing needs a large sum of money and is extremely costly, and it is only suitable for countries where the physical samples of the gas hydrates have been identified. Therefore, it is an effective way and a necessary means to reduce the risks in the drilling exploitation by simulating the forming environment of natural gas hydrate reserves and studying the law and the influence mechanism of the drilling process through the establishment of experimental simulation instruments and equipment in the laboratory. Because the experimental simulation studies are cost-saving and lay a foundation for other studies, the experimental-simulation studies on natural gas hydrate drilling have become the most feasible method for studying natural gas hydrate drilling technology.

In the process of laboratory simulations, the drilling fluid, which is used for conveying the solid particulates produced during the drilling process from the downhole location where it is drilled to the outside, is typically pumped down to the drill bit along a hollow drill stem when a wellbore is drilled into a simulated formation. Different from conventional drilling, the drilling fluid mixture returned from the drilling process of natural gas hydrates carries a large amount of gas and undecomposed hydrate. In order to accurately understand the downhole drilling process, it is necessary to measure the drilling fluids gas carrying and water producing capacities in real time. Because there is a need to maintain a high-pressure and low-temperature state in the simulation process of the hydrate formation, it is necessary to separate the drilling fluid mixture under a high pressure for the polyphase separation so as to facilitate the measurement. Meanwhile, it is also necessary to prevent the formation of new hydrates resulting from the reaction of the gas and the liquid during the process of the separation so as to avoid equipment blockages and inaccurate measurements.

Therefore, there is a need to provide a device for separating the high-pressure and high-speed natural gas hydrate drilling fluid to ensure the separation of the small dry abrasive particles produced during the drilling process from the drilling fluid so as to conduct real-time separated measurement of the gas and liquid carried thereof.

SUMMARY OF THE INVENTION

One of the objectives of the present invention is to provide a system of polyphase separation of natural gas hydrate drilling fluid, suitable for removing the solids from the natural gas hydrate drilling fluid and measuring the gas and water yields in real time so as to provide experimental data and a theoretical basis for the accurate understanding of the downhole hydrate drilling process.

To achieve the purposes above, the present invention adopts the following technical solution:

an experimental device used for the polyphase separation of natural gas hydrate drilling fluid, comprising a solid-phase separator, a liquid injection module, a gas injection module, and a gas-liquid separator, wherein:

the solid-phase separator comprises a cylinder, an upper plug located at the upper end of the cylinder and a lower plug located at the lower end of the cylinder, wherein the upper plug, the lower plug and the cylinder are air-tightly connected to form a closed chamber, the lower plug is provided with an inlet of the solid-phase separator communicated with the closed chamber, the upper side wall of the cylinder is provided with an outlet of the solid-phase separator communicated with the closed chamber, and a first filter device and a second filter device are provided in the closed chamber between the inlet and the outlet of the solid-phase separator;

the gas injection module comprises a gas cylinder, a relief valve, a booster pump, a gas flow meter and a second stop valve, wherein the gas cylinder is communicated with the outlet of the solid-phase separator sequentially through the relief valve, the booster pump, the gas flow meter and the second stop valve via a pipeline;

the liquid injection module comprises a liquid storage balance, a heater, a constant-flux pump and a fourth stop valve, wherein the liquid storage balance is communicated with the inlet of the solid-phase separator sequentially through the heater, the constant-flux pump and the fourth stop valve via a pipeline;

the gas-liquid separator is communicated with the outlet of the solid-phase separator sequentially through a pressure control valve and a third stop valve via a pipeline, wherein the gas-liquid separator is provided with a gas outlet in the upper portion and a liquid outlet in the lower portion;

the natural gas hydrate drilling fluid is communicated with the inlet of the solid-phase separator through a first stop valve via a pipeline.

Furthermore, the first filter device comprises a base, a pressure ring, a filter sheet and a gasket, wherein the base is a hollow cylindrical structure, the pressure ring, the filter sheet and the gasket are fixed onto the inner wall of the base with the filter sheet provided between the pressure ring and the gasket, and the base is fixed onto the inner wall of the cylinder and air-tightly connected with it.

Furthermore, the second filter device comprises a filter net cylinder, a filter net, a joint and a conduit, wherein the filter net cylinder is a hollow cylindrical structure with the side wall provided with filter holes, and the filter net wraps the side wall of the filter web cylinder; the upper end of the filter net cylinder is closed and its lower end is connected to the conduit through the joint, with the upper end of the conduit inserted into the filter net cylinder and the lower end communicated with the inlet of the solid-phase separator.

Furthermore, the solid-phase separator further comprises a holder, an upper pressing cap and a lower pressing cap, wherein the cylinder is provided on the holder, the upper pressing cap, and the upper end of the cylinder are in threaded connection to fix the upper plug to the upper end of the cylinder, and the lower pressing cap and the lower end of the cylinder are in threaded connection to fix the lower ping to the lower end of the cylinder, with the cylinder capable of withstanding a maximum pressure of 25 MPa.

Furthermore, the gas outlet of the gas-liquid separator is connected with a gas meter, and the liquid outlet of the gas-liquid separator is connected with a liquid meter.

The other objective of the present invention is to provide a method of polyphase separation of natural gas hydrate drilling fluid, suitable for removing the solids from the natural gas hydrate drilling fluid and measuring the gas and water yields in real time so as to provide experimental data and a theoretical basis for the accurate understanding of the downhole hydrate drilling process. The experimental method comprises the following steps:

(1) gas injection: open the second stop valve and the gas cylinder, inject gas into the solid-phase separator through the relief valve and the booster pump, and close the second stop valve and the gas cylinder when the gas pressure in the solid-phase separator reaches a predetermined value;

(2) water injection: set the pressure of the pressure control valve, set the temperature of the heater, open the third stop valve and the fourth stop valve, inject hot water into the inlet of the solid-phase separator through the constant-flux pump so that the gas in the solid-phase separator can be discharged by the injected hot water; when the liquid level in solid-phase separator reaches the outlet of the solid-phase separator, the gas in the solid-phase separator will stop being discharged, and the injected hot water will be discharged into the gas-liquid separator through the outlet of the solid-phase separator;

(3) chilling fluid injection: close the fourth stop valve and open the first stop valve so that the high-pressure natural gas hydrate drilling fluid to be processed enters the solid-phase separator through the first stop valve and the inlet of the solid-phase separator, the separated gas and liquid flow out through the outlet of the solid-phase separator and enter the gas-liquid separator through the pressure control valve, and the gas flows out from the gas outlet of the gas-liquid separator while the liquid flows out from the liquid outlet of the gas-liquid separator, so as to enable the real-time measurement and collection of the separated gas and liquid respectively.

Compared with the prior art, the beneficial effects of the present invention are as follows:

(1.) The provision of the outlet in the upper and middle portions of the solid-phase separator and the combination of the liquid injection module and the gas injection module keep the closed chamber of the solid-phase separator in a high-pressure state of the gas-liquid mixture constantly so as to achieve the polyphase separation of natural gas hydrate drilling fluid under high pressure and meanwhile avoid the formation of new hydrates during the process of the separation.

(2.) The sequential provision of the filter cylinder and the filter sheet in the solid-phase separator and the combination of the horizontal filter and the longitudinal filter can effectively remove the solid particles in the drilling fluid so as to prevent equipment blockages and measurement deviations.

Reference number: 1: solid-phase separator; 2: inlet of the solid-phase separator; 3: first stop valve; 4: outlet of the solid-phase separator; 5: gas cylinder: 6: relief valve; 7: booster pump; 8: gas flow meter; 9: second stop valve; 10: third stop valve; 11: pressure control valve; 12: gas-liquid separator; 13: gas outlet; 14: liquid outlet; 15: fourth stop valve; 16: constant-flux pump; 17: heater; 18: liquid storage balance; 19: holder; 20: cylinder; 21: lower plug; 22: lower pressing cap; 23: upper plug; 24: upper pressing cap; 25: base; 26: pressing ring; 27: filter sheet; 28: gasket; 29: filter net cylinder; 30: filter net; 31: joint; 32: conduit.

DETAILED DESCRIPTION OF THE EMBODIMENTS

The present invention is further detailed in combination with the drawings and embodiments as below.

Figure 1:
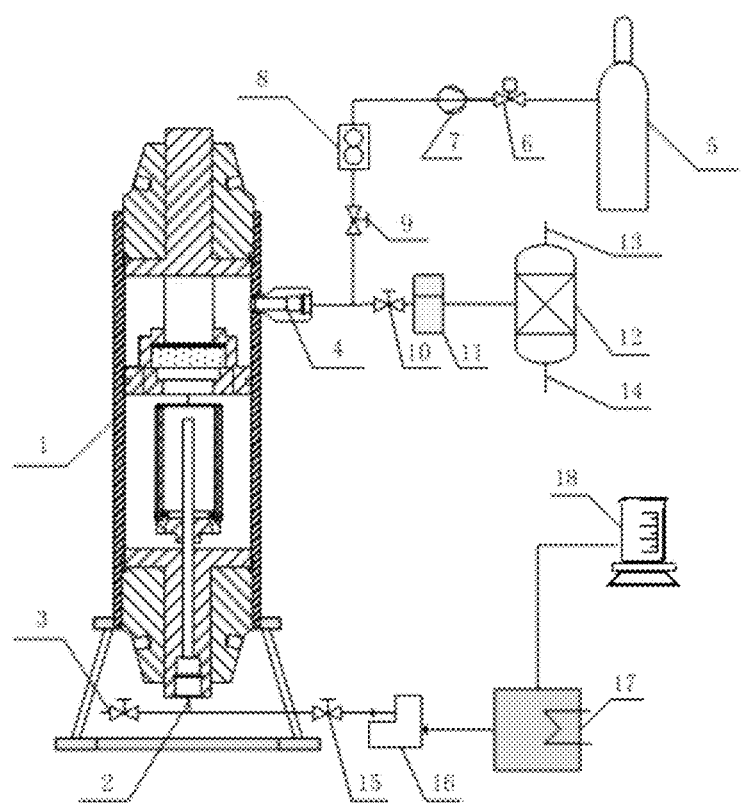
FIG. 1 is an overall structure diagram of the experimental device of the polyphase separation in the present invention.
Figure 2:
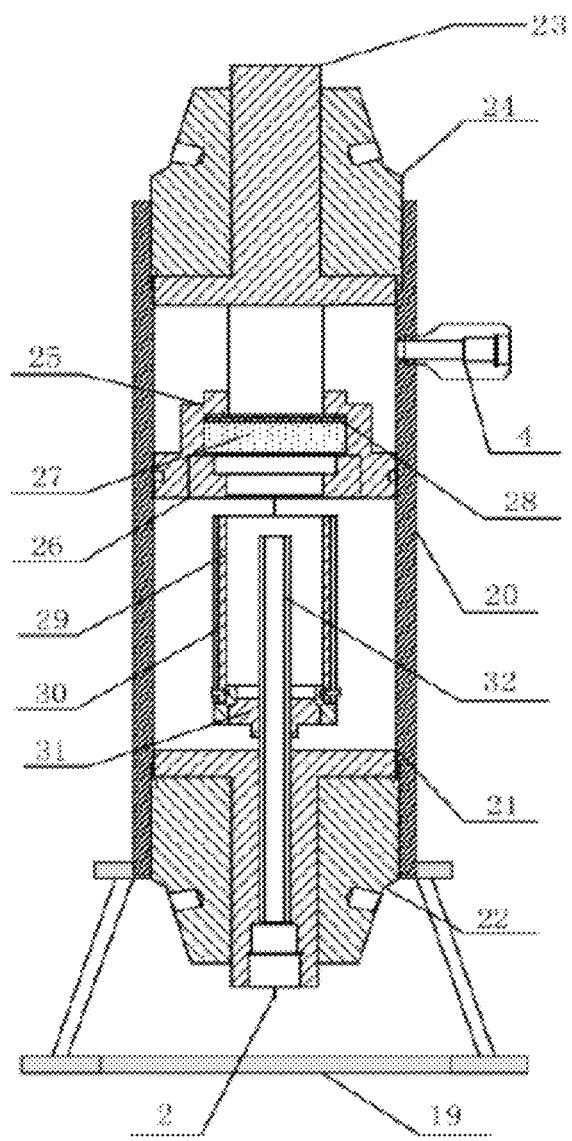
FIG. 2 is a sectional structure diagram of the solid-phase separator in the present invention.

Embodiment:

As shown in FIG. 1 and FIG. 2, an experimental device used for the polyphase separation of natural gas hydrate drilling fluid, comprising a solid-phase separator 1, a liquid injection module, a gas injection module and a gas-liquid separator 12.

Wherein the solid-phase separator 1 comprises a holder 19, a cylinder 20, a lower plug 21, a lower pressing cap 22, an upper plug 23, an upper pressing cap 24, a first filter device and a second filter device. The cylinder 20 is provided on the holder 19, the lower pressing cap 22 and the lower end of the cylinder 20 are in threaded connection to fix the lower plug 21 to the lower end of the cylinder 20, and the upper pressing cap 24 and the upper end of the cylinder 20 are in threaded connection to fix the upper plug 23 to the upper end of the cylinder 20. The lower plug 21 and the upper plug 23 are both in air-tight connection with the inner wall of the cylinder 20 through a seal ring to form a cylindrical closed chamber with a height of 350 mm and a diameter of 68 mm, and its maximum pressure is designed at 25 MPa. The lower plug 21 is provided with an inlet 2 of the solid-phase separator communicated with the closed chamber, and the upper side wall of the cylinder 20 is provided with an outlet 4 of the solid-phase separator communicated with the closed chamber; the first filter device and the second filter device are both provided in the closed chamber and located between the inlet 2 and the outlet 4 of the solid-phase separator.

Wherein the first filter device comprises a base 25, a pressing ring 26, a filter sheet 27 and a gasket 28. The base 25 is a hollow cylindrical structure and fixed onto the inner wall of the cylinder 20 through threads, with the outer wall of the base 25 in air-tight contact with the cylinder 20 through the seal ring; the pressing ring 27 and the lower end of the base 25 is in threaded connection, the gasket 28 is located inside the upper end of the base 25, and the filter sheet 28 is fixed between the pressing ring 27 and the gasket 28 through rotate pressing ring 27, with the diameter of the filter sheet 28 being 48 mm.

Wherein the second filter device comprises a filter net cylinder 29, a filter net 30, a joint 31 and conduit 32. The side wall of the filter net cylinder 29 is evenly arranged with 12×28 filter holes with a diameter of 2 mm and wrapped by the filter net 30, with the upper end of the filter net cylinder 30 closed and the lower end rivet connected with the joint 31; the conduit 32 and the joint 31 are connected through threads, with the upper end of the conduit 32 inserted into the filter net cylinder 29 and its lower end communicated with the inlet 2 of the solid-phase separator.

Wherein the gas injection module comprises a gas cylinder 5, a relief valve 6, a booster pump 7, a gas flow meter 8 and a second stop 9. The gas in the gas cylinder 5 is injected from the outlet 4 of the solid-phase separator into the solid-phase separator 1 sequentially through the relief valve 6, the booster pump 7, the gas flow meter 8, and the second stop valve 9 via a pipeline.

Wherein the liquid injection module comprises a liquid storage balance 18, a heater 17, a constant-flux pump 16 and a fourth stop valve 15. The liquid (i.e. water in this embodiment) in the liquid storage balance 18 is injected from the inlet 2 of the solid-phase separator into the solid-phase separator 1 sequentially through the heater 17, the constant-flux pump 16 and the fourth stop valve 15 via a pipeline.

Wherein the gas-liquid separator 12 is communicated with the outlet 2 of the solid-phase separator sequentially through a pressure control valve 11 and a third stop valve 10 via a pipeline, and the upper portion of the gas-liquid separator 12 is provided with a gas outlet 13 connected with a gas meter (not shown in the figure) and its lower portion is provided with a liquid outlet 14 connected with a liquid meter (not shown in the figure).

Wherein the natural gas hydrate drilling fluid to be processed is communicated with the inlet 2 of the solid-phase separator through a first stop valve 3 via a pipeline.

The experimental method using the above-mentioned experimental device of polyphase separation of natural gas hydrate drilling fluid in the embodiment of the present invention comprises the following steps:

(1) gas injection: open the second stop valve and the gas cylinder, inject gas into the solid-phase separator through the relief valve and the booster pump, and close the second stop valve and the gas cylinder when the gas pressure in the solid-phase separator reaches a predetermined value;

(2) water injection: set the pressure of the pressure control valve, set the temperature of the heater, open the third stop valve and the fourth stop valve, inject the hot water into the inlet of the solid-phase separator through the constant-flux pump so that the gas in the solid-phase separator can be discharged by the injected hot water; when the liquid level in solid-phase separator reaches the outlet of the solid-phase separator, the gas in the solid-phase separator will stop being discharged, and the injected hot water will be discharged into the gas-liquid separator through the outlet of the solid-phase separator;

(3) chilling fluid injection: close the fourth stop valve and open the first stop valve so that the high-pressure natural gas hydrate drilling fluid to be processed enters the solid-phase separator through the first stop valve and the inlet of the solid-phase separator, the separated gas and liquid flow out through the outlet of the solid-phase separator and enter the gas-liquid separator through the pressure control valve, and the gas flows out from the gas outlet of the gas-liquid separator while the liquid flows out from the liquid outlet of the gas-liquid separator, so as to enable the real-time measurement and collection of the separated gas and liquid respectively.

In the present invention of the experimental device and method of polyphase separation, the provision of the outlet in the upper and middle portions of the solid-phase separator and the combination of the liquid injection module and the gas injection module keep the closed chamber of the solid-phase separator in a high-pressure state of the gas-liquid mixture constantly so as to achieve the polyphase separation of natural gas hydrate drilling fluid under a high pressure and meanwhile avoid the formation of new hydrates during the process of the separation; the sequential provision of the filter cylinder and the filter sheet in the solid-phase separator and the combination of the horizontal filter and the longitudinal filter can effectively remove the solid particles in the drilling fluid so as to prevent equipment blockages and measurement deviations.

The embodiments mentioned above are only briefed to describe the technical concept and the characteristics of the present invention in order to make those skilled in this art capable of understanding the contents of the invention and implement it based on the contents, but not intended to limit the protection scope of the present invention. Any equivalent modifications or amendments made based on the essence of the contents of the present invention shall all be included in the protection scope of the present invention.

The invention claimed is:

1. An experimental device used for the polyphase separation of natural gas hydrate drilling fluid, comprises a solid-phase separator, a liquid injection module, a gas injection module and a gas-liquid separator, wherein:

the solid-phase separator comprises a cylinder, an upper plug located at the upper end of the cylinder and a lower plug located at the lower end of the cylinder, wherein the upper plug, the lower plug and the cylinder are air-tightly connected to form a closed chamber: the lower plug is provided with an inlet of the solid-phase separator communicated with the closed chamber, the upper side wall of the cylinder is provided with an outlet of the solid-phase separator communicated with the closed chamber, and a first filter device and a second filter device are provided in the closed chamber between the inlet and the outlet of the solid-phase separator;

the gas injection module comprises a gas cylinder, a relief valve, a booster pump, a gas flow meter and a second stop valve, wherein the gas cylinder is communicated with the outlet of the solid-phase separator sequentially through the relief valve, the booster pump, the gas flow meter and the second stop valve via a pipeline;

the liquid injection module comprises a liquid storage balance, a heater, a constant-flux pump and a fourth stop valve, wherein the liquid storage balance is communicated with the inlet of the solid-phase separator sequentially through the heater, the constant-flux pump and the fourth stop valve via a pipeline;

the gas-liquid separator is communicated with the outlet of the solid-phase separator sequentially through a pressure control valve and a third stop valve via a pipeline, wherein the gas-liquid separator is provided with a gas outlet in the upper portion and a liquid outlet in the lower portion;

the natural gas hydrate drilling fluid is communicated with the inlet of the solid-phase separator through a first stop valve via a pipeline.

2. The experimental device used for the polyphase separation of natural gas hydrate drilling fluid according to claim 1, wherein the first filter device comprises a base, a pressure ring, a filter sheet and a gasket, wherein the base is a hollow cylindrical structure, the pressure ring, the filter sheet and the gasket are fixed onto the inner wall of the base with the filter sheet provided between the pressure ring and the gasket, and the base is fixed onto the inner wall of the cylinder and air-tightly connected with it.

3. The experimental device used for the polyphase separation of natural gas hydrate drilling fluid according to claim 1, wherein the second filter device comprises a filter net cylinder, a filter net, a joint and a conduit, wherein the filter net cylinder is a hollow cylindrical structure with the side wall provided with filter holes, and the filter net wraps the side wall of the filter net cylinder; the upper end of the filter net cylinder is closed and its lower end is connected to the conduit through the joint, with the upper end of the conduit inserted into the filter net cylinder and the lower end communicated with the inlet of the solid-phase separator.

4. The experimental device used for the polyphase separation of natural gas hydrate drilling fluid according to claim 3, wherein the solid-phase separator further comprises a holder, an upper pressing cap and a lower pressing cap, wherein the cylinder is provided on the holder, the upper pressing cap and the upper end of the cylinder are in threaded connection to fix the upper plug to the upper end of the cylinder, and the lower pressing cap and the lower end of the cylinder are in threaded connection to fix the lower plug to the lower end of the cylinder, with the cylinder capable of withstanding a maximum pressure of 25 MPa.

5. The experimental device used for the polyphase separation of natural gas hydrate drilling fluid according to claim 4, wherein the gas outlet of the gas-liquid separator is connected with a gas meter, and the liquid outlet of the gas-liquid separator is connected with a liquid meter.

6. A method used for the polyphase separation of natural gas hydrate drilling fluid, using the experimental device according to claim 1, comprising the following steps:

(1) opening the second stop valve and the gas cylinder, injecting gas into the solid-phase separator through the relief valve and the booster pump, and closing the second stop valve and the gas cylinder when the gas pressure in the solid-phase separator reaches a predetermined value;

(2) setting the pressure of the pressure control valve, setting the temperature of the heater, opening the third stop valve and the fourth stop valve, injecting the hot water into the inlet of the solid-phase separator through the constant-flux pump so that the gas in the solid-phase separator can be discharged by the injected hot water; when the liquid level in solid-phase separator reaches the outlet of the solid-phase separator, the gas in the solid-phase separator will stop being discharged, and the injected hot water will be discharged into the gas-liquid separator through the outlet of the solid-phase separator;

(3) closing the fourth stop valve and opening the first stop valve so that the high-pressure natural gas hydrate drilling fluid to be processed enters the solid-phase separator through the first stop valve and the inlet of the solid-phase separator, the separated gas and liquid flow out through the outlet of the solid-phase separator and enter the gas-liquid separator through the pressure control valve, and the gas flows out from the gas outlet of the gas-liquid separator while the liquid flows out from the liquid outlet of the gas-liquid separator, so as to enable the real-time measurement and collection of the separated gas and liquid respectively.

* * * * *